(12) United States Patent
Bjersing et al.

(10) Patent No.: US 10,825,339 B2
(45) Date of Patent: Nov. 3, 2020

(54) METHOD FOR PROVIDING DROWSINESS ALERTS IN VEHICLES

(71) Applicant: VOLVO CAR CORPORATION, Gothenburg (SE)

(72) Inventors: Henrik Bjersing, Vastra Frolunda (SE); Andre Soderlind, Hisings Bavcka (SE)

(73) Assignee: VOLVO CAR CORPORATION, Gothenburg (SE)

( * ) Notice: Subject to any disclaimer, the term of this patent is extended or adjusted under 35 U.S.C. 154(b) by 248 days.

(21) Appl. No.: 16/001,103

(22) Filed: Jun. 6, 2018

(65) Prior Publication Data

US 2018/0357894 A1   Dec. 13, 2018

(30) Foreign Application Priority Data

Jun. 13, 2017 (EP) .................................... 17175740

(51) Int. Cl.
| | |
|---|---|
| *G08G 1/01* | (2006.01) |
| *B60K 28/06* | (2006.01) |
| *G06K 9/00* | (2006.01) |
| *G08B 21/06* | (2006.01) |
| *B60W 40/08* | (2012.01) |

(52) U.S. Cl.
CPC ........... *G08G 1/0141* (2013.01); *B60K 28/06* (2013.01); *G06K 9/00845* (2013.01); *G08B 21/06* (2013.01); *B60W 2040/0827* (2013.01)

(58) Field of Classification Search
CPC .............. G06N 20/00; G06K 9/00845; G06K 9/00335; B60W 50/14; B60W 40/09; B60W 2040/0827; B60W 30/0956; B60W 2050/0089; G08G 1/0104; G08G 1/0129; B60K 28/06; G08B 21/06
See application file for complete search history.

(56) References Cited

U.S. PATENT DOCUMENTS

| | | | | |
|---|---|---|---|---|
| 6,191,694 | B1 * | 2/2001 | Brownlee | ............ B60H 3/0007 180/272 |
| 6,380,859 | B1 * | 4/2002 | Brownlee | ............ B60H 3/0007 180/272 |

(Continued)

OTHER PUBLICATIONS

European Patent Office, Extended European Search Report for related Application No. EP17175740.4, dated Oct. 27, 2017, 11 pages.

*Primary Examiner* — Mussa A Shaawat
(74) *Attorney, Agent, or Firm* — Brooks Kushman P.C.

(57) ABSTRACT

A method and system for providing a drowsiness alert to a driver of a vehicle are described. A drowsiness estimate data set is compared to historical drowsiness data from multiple vehicles. The drowsiness estimate data set includes current drive context data, and traffic situation data indicative of a present traffic situation for the vehicle and the position of the vehicle. The previously collected drowsiness estimate data sets of the historical drowsiness data are each associated with a determined degree of drowsiness of the respective driver when the previous drowsiness estimate data sets were collected. The degree of drowsiness is determined by a drowsiness detection system in the respective vehicle. A drowsiness risk measure is subsequently determined and, based on the drowsiness risk measure and based on a current drive context for the vehicle, a drowsiness alert may be provided to the driver.

14 Claims, 4 Drawing Sheets

(56) References Cited

U.S. PATENT DOCUMENTS

| | | | | |
|---|---|---|---|---|
| 8,044,782 | B2* | 10/2011 | Saban | B60N 2/002 |
| | | | | 340/438 |
| 8,849,501 | B2* | 9/2014 | Cook | G07C 5/0841 |
| | | | | 701/33.4 |
| 9,134,731 | B2* | 9/2015 | Healey | G01C 21/28 |
| 9,965,951 | B1* | 5/2018 | Gallagher | G08G 1/0133 |
| 10,037,689 | B2* | 7/2018 | Taylor | G08G 1/096775 |
| 2004/0183685 | A1 | 9/2004 | Strumolo et al. | |
| 2007/0015117 | A1* | 1/2007 | Freund | G09B 19/167 |
| | | | | 434/65 |
| 2008/0108022 | A1* | 5/2008 | Freund | G09B 19/167 |
| | | | | 434/69 |
| 2008/0180235 | A1* | 7/2008 | Chang | A61B 5/01 |
| | | | | 340/449 |
| 2011/0106442 | A1* | 5/2011 | Desai | G01S 5/0072 |
| | | | | 701/532 |
| 2012/0004802 | A1* | 1/2012 | Horvitz | G06N 20/00 |
| | | | | 701/29.1 |
| 2015/0258995 | A1* | 9/2015 | Essers | B60W 40/08 |
| | | | | 340/576 |
| 2015/0360695 | A1* | 12/2015 | Gluck | B60W 40/08 |
| | | | | 455/414.1 |
| 2016/0267335 | A1 | 9/2016 | Hampiholi | |
| 2017/0032673 | A1* | 2/2017 | Scofield | G01C 21/3469 |
| 2017/0098373 | A1 | 4/2017 | Filley et al. | |
| 2017/0101111 | A1* | 4/2017 | Fung | B60W 50/14 |
| 2017/0172520 | A1 | 6/2017 | Kannan et al. | |
| 2017/0247037 | A1* | 8/2017 | Basir | G06Q 40/08 |
| 2018/0260641 | A1* | 9/2018 | Yadhunandan | G06K 9/00845 |
| 2019/0110103 | A1* | 4/2019 | el Kaliouby | G08G 1/096741 |
| 2019/0162549 | A1 | 5/2019 | Fouad | G08G 1/0129 |
| 2019/0213429 | A1* | 7/2019 | Sicconi | G06K 9/00335 |
| 2020/0057487 | A1* | 2/2020 | Sicconi | G06T 7/11 |

\* cited by examiner

METHOD FOR PROVIDING DROWSINESS ALERTS IN VEHICLES

CROSS-REFERENCE TO RELATED APPLICATIONS

This application claims foreign priority benefits under 35 U.S.C. § 119(a)-(d) to European patent application number EP 17175740.4, filed Jun. 13, 2017, which is incorporated by reference in its entirety.

TECHNICAL FIELD

The present disclosure relates to a method and to a system for providing a drowsiness alert to a driver of a vehicle, and to a vehicle comprising such a system.

BACKGROUND

A tired driver of a vehicle may become inattentive which is a hazard not only for the driver and occupants of the vehicle, but also to drivers of other vehicles and pedestrians in the vicinity of the vehicle. A common scenario is that there is a desire to reach a destination as soon as possible and therefore drivers spends more time driving than what is safe from a drowsiness perspective.

Many vehicles are today equipped with a drowsiness detection system which may provide a warning to the driver when signs of drowsiness are detected. Such system may for example analyze head and/or eye movements of the driver to detect signs of drowsiness. Other systems are based on analyzing the position of the vehicle and steering of the vehicle with regards to lane markers.

However, it is not uncommon that drivers ignore warnings from drowsiness detection systems. It could for example be that the timing of the warning signal is not accurate or simply that the warning is incorrect.

EP3002557 describes one system for preventing an inattentive driver. The system is based on determining whether or not an upcoming road segment is monotonous. If the upcoming road segment is determined to be monotonous, activities may be initiated in the vehicle in order to avoid a situation with a potentially inattentive driver caused by drowsiness. However, even when activities are provided for attempting to keep the driver awake there is a relatively high risk that the driver falls asleep anyway. For example, the driver may ignore such activities the same way as the warnings may be ignored.

Accordingly, there is a need for more improved drowsiness detection for vehicles.

SUMMARY

In view of above, it is an object of the present disclosure to improve drowsiness detection and warnings in vehicles.

According to a first embodiment of the disclosure, there is provided a method for providing a drowsiness alert to a driver of a vehicle, the method comprises: collecting current drive context data for the vehicle including driver behavior data for the driver, and a driving duration for the driver; collecting traffic situation data indicative of a present traffic situation for the vehicle and the time of the day, determining a position of the vehicle, wherein the current drive context data, the traffic situation data, and the position forming a drowsiness estimate data set, providing the drowsiness estimate data set to a remote server, receiving, by the vehicle, a drowsiness risk measure determined based on comparing the drowsiness estimate data set to historical drowsiness data including previously collected drowsiness estimate data sets from a plurality of vehicles and associated determined degree of drowsiness of the respective driver when the previous drowsiness estimate data sets were collected in the plurality of vehicles, the determined degree of drowsiness was determined by a drowsiness detection system in the respective vehicle, based on at least the drowsiness risk measure, providing a drowsiness alert to the driver.

The present disclosure is based on the realization that a more accurate drowsiness alert may be provided by comparing data associated with the vehicle traffic situation, position and the current drive context, with previously collected data. This historical data is additionally associated with drowsiness data determined by drowsiness detection systems in the respective vehicles from which the historical data was collected. Thus, it is realized that it is possible to adapt the providing of drowsiness alerts to a driver of a vehicle based on statistics formed from data from other vehicles or optionally also from other information sources. For example, data may be related to a driving duration for a driver, in a certain traffic situation (e.g. highway with low intensity traffic), and based on this and a present drive context, e.g. time of day, it may be determined whether or not a warning signal should be provided.

Accordingly, the disclosure provides the advantages that the timing of drowsiness alerts provided to the driving may be improved such that the alerts become more efficient. In particular, the driver may adapt a behavior that the alert is not to be ignored but should be taken seriously.

The traffic situation data may be indicative of the time of the day, the traffic intensity level (e.g. indicative of low intensity rural traffic or high intensity city traffic), road stretch characteristics (e.g. level of monotonous road, altitude changes, amount of curves, width of road, road speed limit, type of road such as gravel or asphalt). The time of the day may be included in other types of traffic situation data, e.g. the time of the day with a traffic situation level.

The current drive context may further include at least one of road type, time of day, length of current drive journey, degree of assisted driving used in the current drive journey etc.

The driver behavior data is indicative of how the driver acts when driving. For example, for how long has the current drive stretch been in progress, is the driver able to keep a consistent path on the road, etc.

The position of the vehicle may for example be determined based on GPS data collected by a GPS in the vehicle.

The comparison of a drowsiness estimate data set to historical drowsiness data may be performed based on found patterns in the historical data which may have lead to drowsy behavior of previous drivers. Thus the drowsiness estimate data set collected for a present vehicle is mapped with the historical data from other vehicles in order to determine whether or not the behavior of the present vehicle and the traffic situation for the present vehicle is indicative of an elevated risk of a drowsy driver. The data for the present vehicle (i.e. the drowsiness estimate data set) may also be compared to data from other sources such as data from weather stations, or road authorities.

The comparing of drowsiness estimate data set to historical drowsiness data may be performed on a remote server, i.e. in the "Cloud". Thus, the drowsiness estimate data set is uploaded to the remote server. A drowsiness risk measure is determined based on the comparing step performed on the server, wherein, the drowsiness risk measure is received by the vehicle from the server (or from an intermediate server).

Based on the drowsiness risk measure, and based on a determined present degree of drowsiness of the driver, the drowsiness alert may be provided to the driver.

Furthermore, since the assessment of the drowsiness risk measure may be performed in the Cloud on the server, the drowsiness risk measure may advantageously only be received from the Cloud when the drowsiness risk measure indicates elevated levels of drowsiness risk. In other words, the server may not provide any alert to the vehicle if it is judged that there is no or only a small risk of drowsiness present. In such case a drowsiness detection system in the vehicle performs estimation of drowsiness risk independent of a drowsiness risk measure.

Accordingly, in embodiments of the disclosure, the steps of comparing the drowsiness estimate data set to historical drowsiness data from a plurality of vehicles, and determining a drowsiness risk measure, may be performed on the server.

The degree of drowsiness may be determined by a drowsiness detection system in the vehicle. Such a system may function based on analyzing head movements and/or eye movements for detecting signs of drowsiness. The detection may further be based on analyzing an expected driving path with the actual driving path. Drowsiness determination systems are known per se to the skilled addressee. Several drowsiness detection systems may be included in a vehicle. For example, a first drowsiness detection system may be based on analyzing eye movements and a second drowsiness detection system may be based on analyzing an expected driving path with the actual driving path, e.g. by detecting road lane markers.

In one embodiment, when a degree of drowsiness of the driver in the vehicle is indicative of a drowsy driver, a drowsiness risk measure may be requested from the server by the vehicle. There is thus possible for the vehicle to request a drowsiness risk measure from the server.

According to embodiments of the disclosure, the method may comprise comparing the vehicle position with positions of road segments indicated as false drowsiness road segments, wherein a false drowsiness road segments is identified based on that drowsiness has been repeatedly indicated in historical drowsiness data based on at least one of driver behavior data and traffic situation data at the same time as the determined degree of drowsiness indicates an alert driver.

Hereby, the method advantageously takes into account the probability that a false drowsiness may have been detected which may further improve the timing and efficiency of the provided alerts. It may for example be that an excessive amount of drowsy drivers have been reported for a road segment during daytime driving, without other data (drive context data, behavior data, or traffic situation data) supporting the supposedly detected drowsiness. Such drivers may for example have been mistakenly taken for being drowsy due to a driving behavior caused by sun reflections or poor lane markers, etc. which may cause a deviating driving behavior without the driver being drowsy.

If it is determined that a road segment is a false drowsiness road segment, the drowsiness alert associated with that road segment may not be provided to the driver. The road segment may be an upcoming road segment ahead of the vehicle or a current road segment currently being traveled on.

A false road segment may be identified by several sources of data, for example, if a road segment is known to have poor lane markers may cause a road segment to be identified as a false drowsiness road segment. Such poor lane markers may cause a drowsiness detection system to erroneously detect a drowsy driver which in reality is not drowsy. The distribution of determined drowsiness from a plurality of vehicles may form a basis for identifying a false drowsiness road segment. For example, if the distribution of determined drowsiness cases with respect to traffic situation data deviates excessively from a normal distribution of reported drowsiness cases the road segment may be indicated as a false drowsiness road segment.

According to one embodiment, when a degree of drowsiness of the driver determined by a drowsiness detection system in the vehicle is indicative of a drowsy driver, the determination of the false drowsiness road segment may be overridden and the drowsiness alert is provided to the driver by the drowsiness detection system. In other words, if the drowsiness detection system in the vehicle indicates a drowsy driver, the indication of the false drowsiness road segment may be ignored and the drowsiness alert is anyhow provided to the driver. Hereby, the safety provided by the drowsiness detection system in the individual vehicle is not compromised.

For example, it may occur that a first drowsiness detection system based on e.g. eye and/or head movements indicates that the driver is drowsy, and the present road segment is indicated as a false drowsiness detection path, based on data from a second drowsiness detection systems operating based on detecting road lane markers. In such case, i.e. when the drowsiness detection system operates based on a different analysis, the indicated false drowsiness road segment is ignored and the drowsiness alert is anyhow provided to the driver.

According to a second embodiment of the present disclosure there is provided a system for providing a drowsiness alert to a driver of a vehicle, the system comprises: a drive context data collecting unit for determining driver behavior data including driving duration for the driver; a traffic situation data collecting unit for collecting traffic situation data indicative of a present traffic situation for the vehicle, a position determining unit for determining a position of the vehicle, a wireless communication unit for communicating with a remote server, a system control unit for providing a drowsiness estimate data set to the remote server, the drowsiness estimate data set comprising wherein the remote server comprises a server control unit for comparing the drowsiness estimate data set to historical drowsiness data including previously collected drowsiness estimate data sets from a plurality of vehicles and associated determined degree of drowsiness of the respective driver when the previous drowsiness estimate data sets were collected in the plurality of vehicles, the determined degree of drowsiness was determined by a drowsiness detection system in the respective vehicle, and for determining a drowsiness risk measure based on the comparison, wherein the system control unit is configured to: receive the drowsiness risk measure from the remote server and provide a drowsiness alert to the driver based on at least the drowsiness risk measure.

The system may further comprise a drowsiness detections system for detecting drowsiness of the driver of the vehicle.

The driver behavior data may be based on e.g. user interaction patterns with the vehicle HMI (human-machine interface), use pattern of buttons in the vehicle, entertainments system usage, eye movements, steering wheel controls, operating patterns of actuators of the vehicle, etc. Thus, the driver behavior data may be collected by various sensors and/or cameras arranged in the vehicle.

The drive context data collecting unit may share sensors and components with the traffic situation data collecting unit and the drowsiness detections system. Thus, the drive context data collecting unit may comprise control units in itself, cameras, actuator sensors, etc.

The traffic situation data collecting unit may comprise e.g. exterior cameras which may capture image data of the surroundings of the vehicle, radars, LIDAR's, etc.

This second embodiment of the disclosure provides similar advantages as discussed above in relation to the previous embodiment of the disclosure.

According to a third embodiment of the present disclosure, there is provided a vehicle comprising a control unit and wireless communication unit wirelessly connected to a server, wherein the control unit is configured to: collect current drive context data for the vehicle including driver behavior data for the driver, and a driving duration for the driver; collecting traffic situation data indicative of a present traffic situation for the vehicle and the time of the day, determining a position of the vehicle, the driver behavior data, the traffic situation data, and the position forming a drowsiness estimate data set, provide the drowsiness estimate data set to a remote server, wherein, in the server, the drowsiness estimate data set is compared to historical drowsiness estimate data sets from a plurality of vehicles, wherein a drowsiness risk measure is determined based on the comparison and based on associated determined degree of drowsiness of the respective driver when the previous drowsiness estimate data sets were collected in the plurality of vehicles, the determined degree of drowsiness was determined by a drowsiness detection system in the respective vehicle, based on the drowsiness risk measure, the control unit is configured to provide a drowsiness alert to the driver.

Advantageously, the drowsiness risk measure may be received by the vehicle from the remote server.

The vehicle may further comprise a global positioning system for determining the position of the vehicle, where the control unit receives data indicative of the position from the global positioning system.

This third embodiment of the disclosure provides similar advantages as discussed above in relation to the previous embodiments of the disclosure.

Any control unit, drive context data collecting unit, traffic situation data collecting unit, position determining unit, wireless communication unit, remote server, server control unit, system control unit, drowsiness detection system, global positioning system, or any other unit, server, system, circuit, device, arrangement, or the like described herein may include a microprocessor, microcontroller, programmable digital signal processor or another programmable device. Such unit(s) and/or the like may also, or instead, include an application specific integrated circuit, a programmable gate array or programmable array logic, a programmable logic device, or a digital signal processor. Where such unit(s) and/or the like includes a programmable device such as the microprocessor, microcontroller or programmable digital signal processor mentioned above, the processor may further include associated memory and computer executable code that controls operation of the programmable device. In that regard, any such unit(s) and/or the like described herein may comprise and/or be implemented in or by one or more appropriately programmed processors (e.g., one or more microprocessors including central processing units (CPU)) and associated memory and/or storage, which may include data, microcode, firmware, operating system software, application software and/or any other suitable program, code or instructions executable by the processor(s) for controlling operation thereof, for controlling the various features and/or components described herein, for providing and/or controlling interaction and/or cooperation between the various features and/or components described herein, and/or for performing the particular algorithms represented by the various functions and/or operations described herein.

In summary, the present disclosure relates to a method for providing a drowsiness alert to a driver of a vehicle. A drowsiness estimate data set is compared to historical drowsiness data from a plurality of vehicles. The drowsiness estimate data set comprises current drive context data, and traffic situation data indicative of a present traffic situation for the vehicle and the position of the vehicle. The previously collected drowsiness estimate data sets of the historical drowsiness data are each associated with a determined degree of drowsiness of the respective driver when the previous drowsiness estimate data sets were collected. The degree of drowsiness is determined by a drowsiness detection system in the respective vehicle. A drowsiness risk measure is subsequently determined and based on the drowsiness risk measure and based on a current drive context for the vehicle, a drowsiness alert may be provided to the driver.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing example embodiments of the disclosure, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method according to the present disclosure are mainly described with reference to a vehicle in the form of a car. However, the present disclosure may equally be used for any other type vehicle such as e.g. a bus, a truck, etc. Thus, this disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Figure 1:
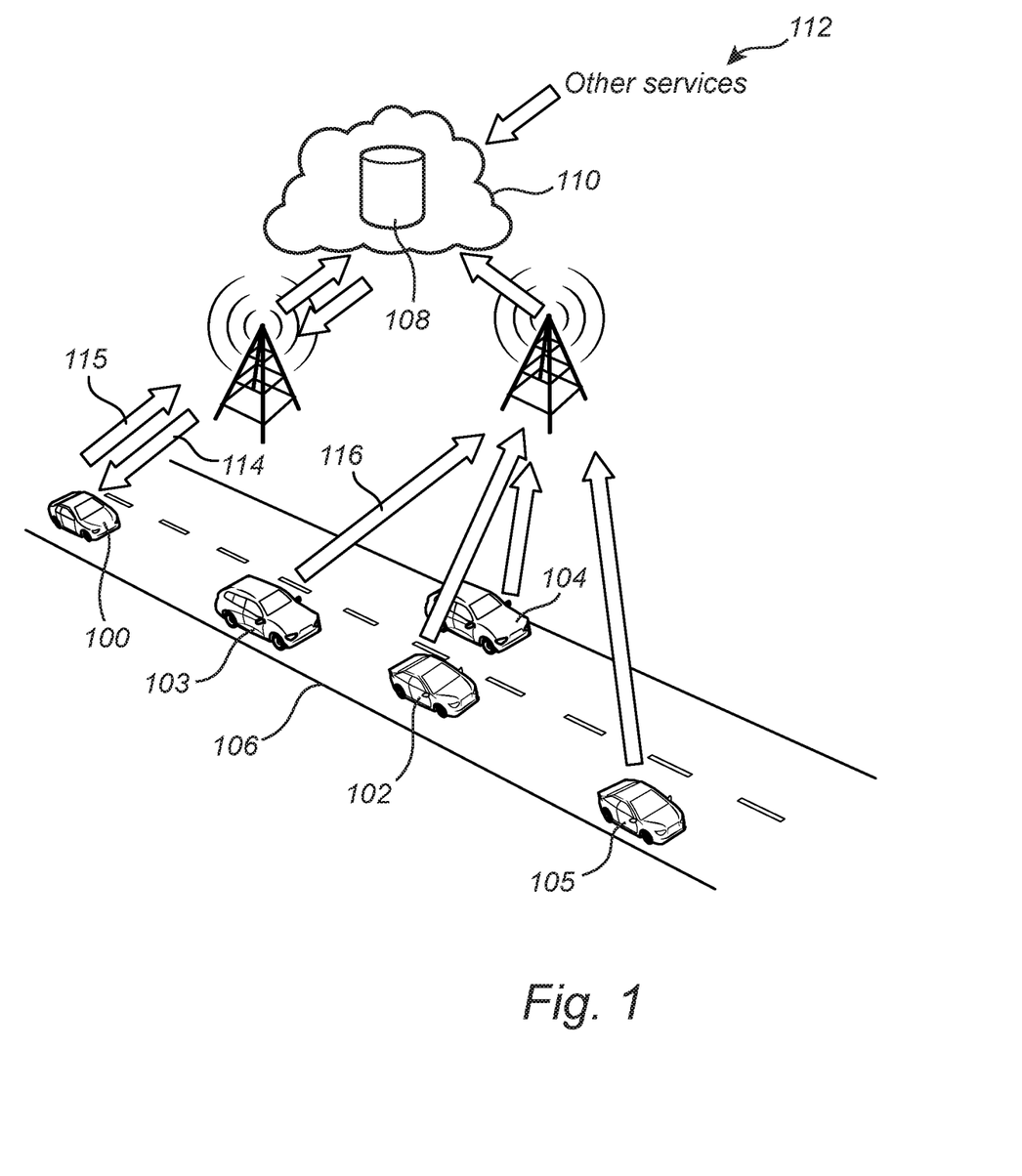
FIG. 1 conceptually illustrates embodiments of the disclosure.

FIG. 1 conceptually illustrates a plurality of vehicles in the form of cars (100, 102, 103, 104, 105) driving along a road segment 106. Each of the cars is able to communicate with a remote server 108, i.e. to receive and transmit data to/from the "Cloud" 110. The connection with the server 108 may be provided via e.g. mobile communication technology, Wi-Fi, etc.

In the presently illustrated example, the vehicles 102-105 have previously uploaded historical drowsiness data related to its traffic situation and current drive context data including driver behavior on the road segment 106. It should however be noted that traffic situation data may also be provided from other services 112 such as a traffic/road authorities, online weather forecasts, or other online services. The vehicles 102-105 have also provided data related to the degree of drowsiness of the respective driver of the vehicles 102-105 when the traffic situation data and current drive context data included in the previous data was collected. Such data related to the degree of drowsiness may be determined by a drowsiness detection system in the respective vehicle 102-105.

The vehicle 100 uploads its data 115 related to the present traffic situation and the current drive context, and also data indicating the present position of the vehicle. The present position may be determined by a global positioning system (GPS, not shown) comprised in the vehicle 100. The position of the vehicles 102-105 may of course be determined by a respective GPS in the vehicles 102-105.

The drowsiness estimate data set 115 comprising the traffic situation data, the current drive context, and the position data, is compared in the Cloud to the historical drowsiness data 116 (only one is numbered) including previously collected drowsiness data sets collected from the other vehicles 102-105 and/or further traffic situation data provided by the other services 112. Furthermore, the historical drowsiness data includes determined degrees of drowsiness of the driver in the respective vehicle (102-105) when the previous drowsiness estimate data was collected.

It should be noted that although only four vehicles (102-105) are shown here from which historical data was collected, the plurality of vehicles may comprise, and typically does comprise, significantly more vehicles than four in order to form statistically accurate historical data sets. Thus, four vehicles (102-105) are shown only to represent the plurality of vehicles.

Based on the comparison of the drowsiness estimate data from the vehicle 100 with the historical drowsiness data (including previously collected drowsiness estimate data and associated determined degree of drowsiness) collected from the plurality of vehicles 102-105, a drowsiness risk measure is determined in the Cloud. The drowsiness risk measure may be determined by finding patterns in the data received from the vehicle 100 (for which the drowsiness risk measure is to be determined) which resembles patterns in the historical drowsiness data. For example, if the data received from the vehicle 100 at least partly correlates with historical drowsiness data which were associated with drowsy drivers, the drowsiness risk measure may indicate that a risk for drowsiness of the driver of the vehicle 100 is present. In such case, the vehicle may decide to provide a drowsiness alert to the driver.

The current drive context may comprise at least one of the ones on the non-exhaustive list comprising road type, time of day, length of current drive journey, degree of assisted driving used in the current drive journey.

The determining of the drowsiness risk measure may be performed by a machine learning algorithm being taught on training data to identify patterns in the data received from a present vehicle for which the drowsiness risk measure is to be determined, which may be associated with a risk for a drowsy driver. Such machine learning algorithm may be running a supervised learning algorithm.

It may occur that the drowsiness detection systems of vehicles provide false positives, i.e. indications of a drowsy driver when in fact the driver is not drowsy. Instead the detection of a drowsy driver may be triggered by another event. For example poor lane marks may cause a driver to appear to drive in a less straight manner, or sun reflections in the windscreen or reflections form other light sources such as road lights or billboards, city lights, etc. may affect the driver behavior. Such disturbances may cause a relatively large amount reported drowsy drivers (i.e. high degrees of drowsiness) during daytime in a traffic situation not normally associated with drowsy drivers (e.g. high intensity traffic), thereby it may be concluded that the road segment may be a false drowsiness road segment.

Furthermore, a false drowsiness road segment may be identified by the frequency of reported drowsy drivers during specific time duration. For example, if a relatively large amount (that exceeds a threshold) of drowsy drivers are reported during a relatively short recurrent time period on the same road segment, it may also be determined that the road segment is a false drowsiness road segment for that time period. To be more concrete, if the amount of drowsy drivers is disproportionally large for a certain road segment during a time span of e.g. 2 hours daytime, it may be suspected that other factors have triggered the detection of a drowsy driver rather than the driver actually being drowsy. If it is determined that the vehicle position coincides with a false drowsiness road segment, the vehicle drowsiness detection system may determine to omit to provide a drowsiness alert to the driver of the vehicle 100.

The vehicle may advantageously comprise a drowsiness detection system adapted to determine whether the driver is drowsy. Such systems are known per se to the skilled person, and may operate by analyzing head movements, eye movements, or the like. If the drowsiness detection system determines that the driver is drowsy, e.g. the degree of drowsiness is above a threshold, the driver may be provided with an alert from the drowsiness detection system regardless of a false road segment. The vehicle advantageously comprises multiple drowsiness detection systems. For example, a first drowsiness detection system may operate based on analyzing head and/or eye movements and a second drowsiness detection system may operate based on detecting road lane markers.

Figure 2:
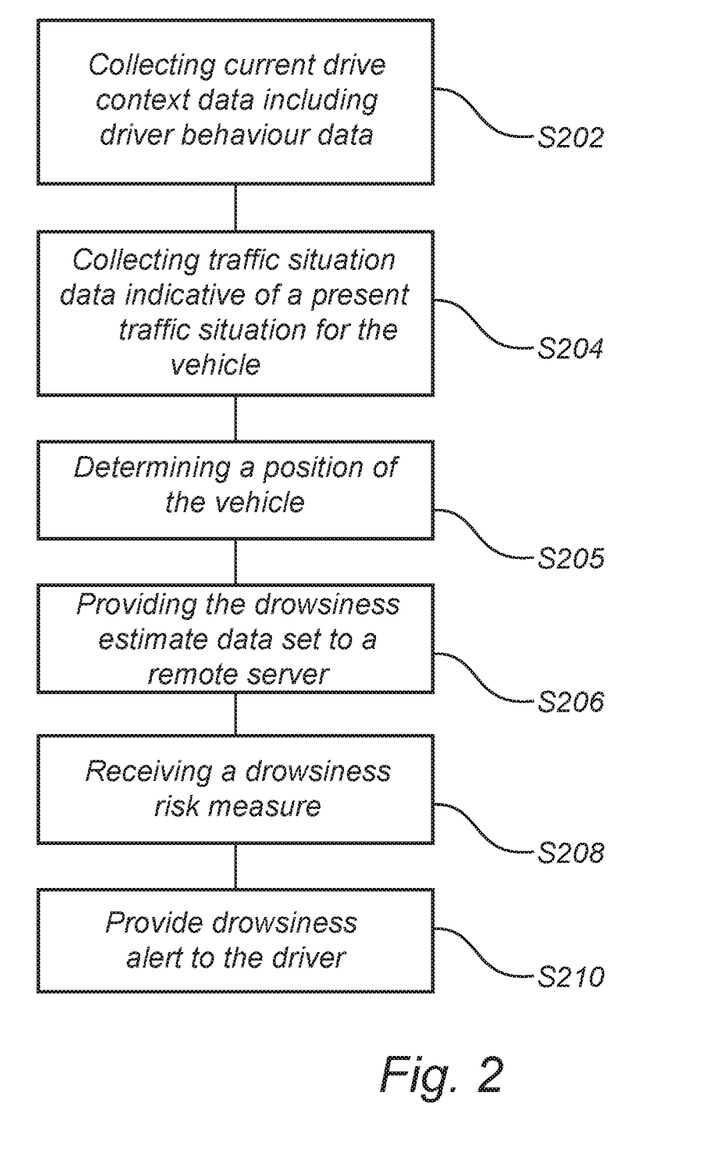
FIG. 2 is a flow-chart of method steps according to embodiments of the disclosure.

FIG. 2 is a flow-chart of method steps according to an embodiment of the disclosure. In a first step S202 current drive context data including driver behavior data for the driver is collected, the data further including a driving duration for the driver. Further, traffic situation data is collected S204 indicative of a present traffic situation for the vehicle, and a position of the vehicle is also determined S205. The current drive context data, traffic situation data, and the position forms a drowsiness estimate data set which is provided to a remote server in step S206. The drowsiness estimate data set is compared to historical drowsiness data including previously collected drowsiness estimate data sets from a plurality of vehicles and associated determined degrees of drowsiness. The determined degree of drowsiness is determined by a drowsiness detection system in the respective vehicle. A drowsiness risk measure is determined based on the comparison of the drowsiness estimate data set to the historical drowsiness data, wherein the drowsiness risk measure is received S208 by the vehicle.

The comparing of the drowsiness estimate data from the present vehicle with the historical drowsiness data (step S207 in FIG. 3) may advantageously be performed in the Cloud, i.e. on the server 108 to which the drowsiness estimate data set is uploaded from the vehicle. Further, the drowsiness risk measure 114 is determined on the server 108 and is subsequently provided to the vehicle 100.

Based on the drowsiness risk measure a drowsiness alert may be provided S210 to the driver. The drowsiness risk measure 114 is evaluated together with a determined degree of drowsiness of the driver of the vehicle, the degree of drowsiness being determined by the drowsiness detection system in the vehicle. Based on this evaluation is it determined if a drowsiness alert should be provided to the driver.

Figure 3:
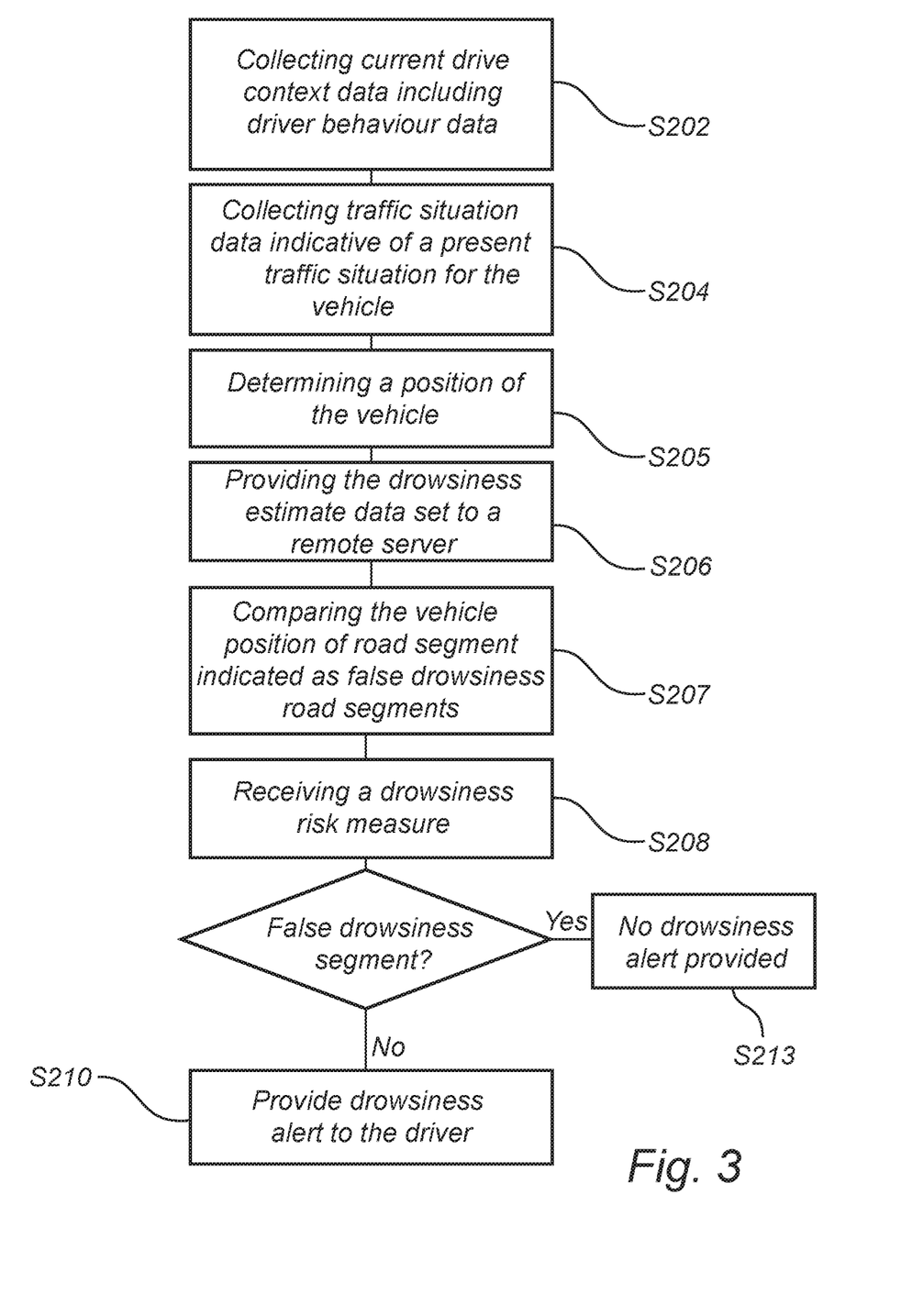
FIG. 3 is a flow-chart of method steps according to embodiments of the disclosure.

FIG. 3 is a flow-chart according to further embodiments of the disclosure. In FIG. 3, there is an additional step S207 to compare the vehicle position with positions of false drowsiness road segments. If the present position, or an upcoming position of the vehicle is determined to be on a false drowsiness road segment, it may be determined by the vehicle drowsiness detection system to not provide S213 a drowsiness alert to the driver of the vehicle 100. If there is no upcoming or present false drowsiness road segment the method proceeds as described with reference to FIG. 2.

Figure 4:
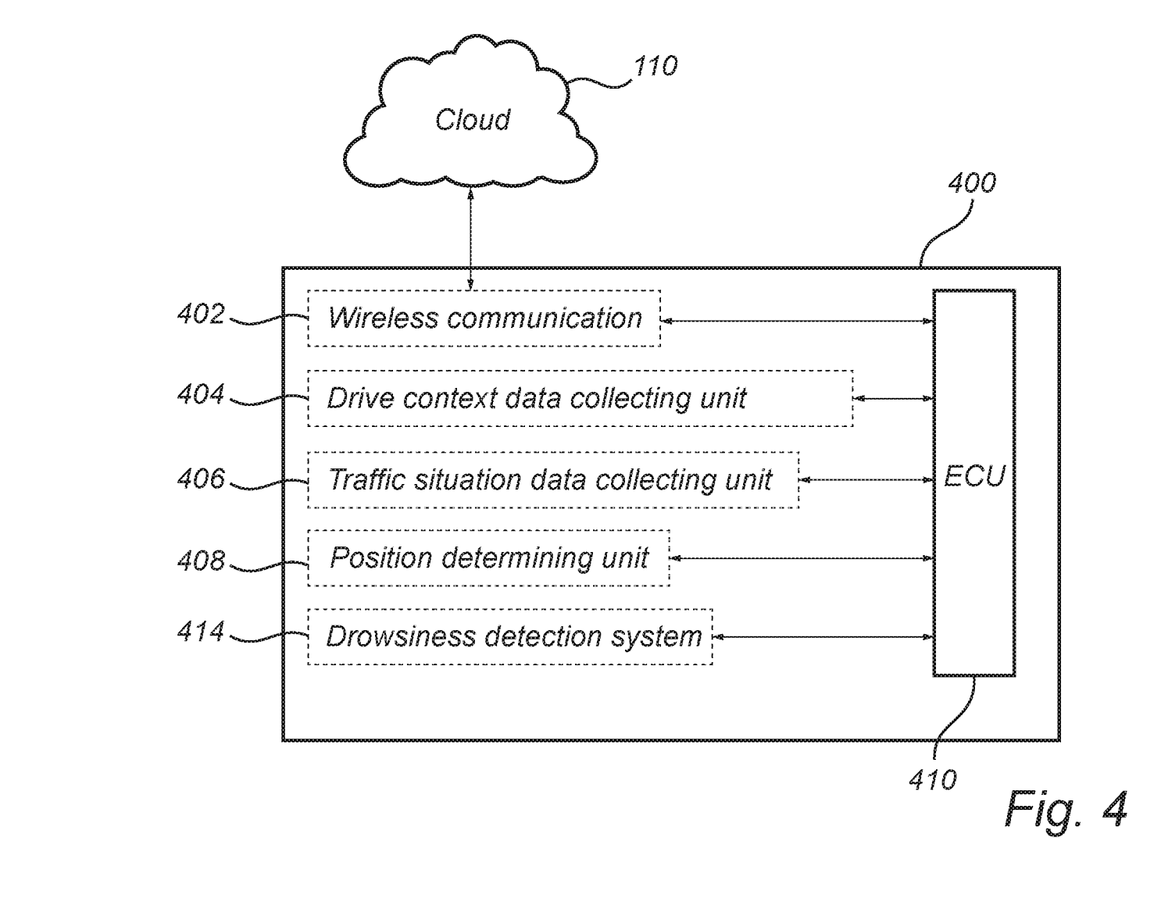
FIG. 4 conceptually illustrates a system according to embodiments of the disclosure.

FIG. 4 conceptually illustrates a system 400 for providing a drowsiness alert to a driver of a vehicle according to embodiments of the vehicle. A wireless communication unit 402 is provided such that the system may communicate with the Cloud 110, i.e. with a remote server. The system comprises a drive context data collecting unit 404 for determining e.g. driver behavior data including driving duration for the driver, and a traffic situation data collecting unit 406 for collecting traffic situation data indicative of a present traffic situation for the vehicle. The system further comprises a position determining unit 408 for determining a position of the vehicle. The position determining unit may for example comprise a GPS.

A control unit 410 is configured to provide a drowsiness estimate data set to a remote server (e.g. to the Cloud 110). In the server, a server control unit (not shown) is configured for comparing the drowsiness estimate data set to historical drowsiness data including previously collected drowsiness estimate data sets from a plurality of vehicles. The historical drowsiness data further includes associated determined degree of drowsiness of the respective driver when the previous drowsiness estimate data sets were collected from the plurality of vehicles.

The server control unit is further configured for determining a drowsiness risk measure based on the comparison of the drowsiness estimate data set to the historical drowsiness data. The system control unit 410 is configured to receive a drowsiness risk measure from the Cloud 110. The control unit 410 may thereafter provide a drowsiness alert to the driver based on the drowsiness risk measure and based on the degree of drowsiness determined by a drowsiness detection system 414 in the vehicle.

The driver behavior data may be based on e.g. user interaction patterns with the vehicle HMI (human-machine interface), use pattern of buttons in the vehicle, entertainments system usage, eye movements, steering wheel controls, operating patterns of actuators of the vehicle, etc. Thus, the driver behavior data may be collected by various sensors and/or cameras arranged in the vehicle.

The traffic situation data collecting unit may comprise e.g. exterior cameras which may capture image data of the surroundings of the vehicle, radars, LIDAR's, etc.

A drowsiness detection system may use e.g. interior cameras to capture eye and/or head movements, exterior cameras and/or radar systems to analyze the vehicle movements with respect to the surroundings, e.g. road lane markers.

It should be understood that the drive context data collecting unit 404, the traffic situation data collecting unit 406, and the drowsiness detection system may share sensors, cameras, radars, or other components.

The person skilled in the art realizes that the present disclosure by no means is limited to the embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for providing a drowsiness alert to a driver of a vehicle, the method comprising:
   collecting current drive context data for the vehicle including driver behavior data for the driver and a driving duration for the driver;
   collecting traffic situation data indicative of at least a traffic intensity level for the vehicle and a time of day;
   determining a position of the vehicle;
   wherein the current drive context data, the traffic situation data, and the position form a drowsiness estimate data set;
   providing the drowsiness estimate data set to a remote server;
   receiving, by the vehicle, a drowsiness risk measure determined based on a comparison of the drowsiness estimate data set to historical drowsiness data including previously collected drowsiness estimate data sets from a plurality of vehicles and associated determined degree of drowsiness of the respective driver when the previous drowsiness estimate data sets were collected in the plurality of vehicles, the determined degree of drowsiness determined by a drowsiness detection system in the respective vehicle;
   providing a drowsiness alert to the driver based on at least the drowsiness risk measure.

2. The method according to claim 1 further comprising:
   uploading, from the vehicle, the drowsiness estimate data set to a remote server;
   receiving, from the server, the drowsiness risk measure, wherein, based on the drowsiness risk measure, and based on a determined present degree of drowsiness of the driver, provide the drowsiness alert to the driver.

3. The method according to claim 2 wherein the drowsiness risk measure is only received when the drowsiness risk measure indicates elevated levels for risk of drowsiness.

4. The method according to claim 2 wherein comparing the drowsiness estimate data set to historical drowsiness data from a plurality of vehicles and determining a drowsiness risk measure are performed on the server.

5. The method according to claim 1 further comprising requesting a drowsiness risk measure from the server when a degree of drowsiness of the driver in the vehicle is indicative of a drowsy driver.

6. The method according to claim 1 wherein the comparing comprises comparing the vehicle position with positions of road segments indicated as false drowsiness road segments, wherein a false drowsiness road segment is identified based on that drowsiness has been repeatedly indicated in historical drowsiness data based on at least one of driver behavior data and traffic situation data at the same time as the determined degree of drowsiness indicates an alert driver.

7. The method according to claim 6 wherein when it is determined that a road segment is a false drowsiness road segment, the drowsiness alert is not provided to the driver of the vehicle.

8. The method according to claim 7 wherein, when a degree of drowsiness of the driver determined by a drowsiness detection system in the vehicle is indicative of a drowsy driver, the determination of the false drowsiness road segment is overridden and the drowsiness alert is provided to the driver by the drowsiness detection system.

9. The method according to claim 1 wherein the current drive context is at least one of road type, time of day, length of current drive journey, degree of assisted driving used in the current drive journey.

10. A system for providing a drowsiness alert to a driver of a vehicle, the system comprising:
a drive context data collecting unit for collecting drive context data including driver behavior data and a driving duration for the driver;
a traffic situation data collecting unit for collecting traffic situation data indicative of at least a traffic intensity level for the vehicle;
a position determining unit for determining a position of the vehicle;
a wireless communication unit for communicating with a remote server; and
a system control unit for providing a drowsiness estimate data set to the remote server, the drowsiness estimate data set comprising drive context data and a position of the vehicle;

wherein the remote server comprises a server control unit for comparing the drowsiness estimate data set to historical drowsiness data including previously collected drowsiness estimate data sets from a plurality of vehicles and associated determined degree of drowsiness of the respective driver when the previous drowsiness estimate data sets were collected in the plurality of vehicles, the determined degree of drowsiness determined by a drowsiness detection system in the respective vehicle, and for determining a drowsiness risk measure based on the comparison;
wherein the system control unit is configured to receive the drowsiness risk measure from the remote server and provide a drowsiness alert to the driver based on at least the drowsiness risk measure.

11. The system according to claim 10 further comprising a drowsiness detections system for detecting drowsiness of the driver of the vehicle.

12. A vehicle comprising a control unit and a wireless communication unit configured to wirelessly connect to a remote server, wherein the control unit is configured to:
collect current drive context data for the vehicle including driver behavior data for the driver and a driving duration for the driver;
collect traffic situation data indicative of at least a traffic intensity level for the vehicle and a time of day;
determine a position of the vehicle, wherein the driver behavior data, the traffic situation data, and the position form a drowsiness estimate data set;
provide the drowsiness estimate data set to the remote server, wherein the remote server is operable to compare the drowsiness estimate data set to historical drowsiness estimate data sets from a plurality of vehicles, and determine a drowsiness risk measure based on the comparison and based on associated determined degree of drowsiness of the respective driver when the previous drowsiness estimate data sets were collected in the plurality of vehicles, the determined degree of drowsiness being determined by a drowsiness detection system in the respective vehicle; and
provide a drowsiness alert to the driver based on the drowsiness risk measure.

13. The vehicle according to claim 12 wherein the drowsiness risk measure is received by the vehicle from the remote server.

14. The vehicle according to claim 12 further comprising a global positioning system for determining the position of the vehicle, where the control unit receives data indicative of the position from the global positioning system.

* * * * *